US010880615B2

(12) United States Patent
Wright et al.

(10) Patent No.: US 10,880,615 B2
(45) Date of Patent: Dec. 29, 2020

(54) PORTABLE BROADCASTING SYSTEM

(71) Applicant: X-Stream Technologies LLC, Stratford, TX (US)

(72) Inventors: Greg Wright, Stratford, TX (US); Steve Batti, Stratford, TX (US); Noah Holte, Stratford, TX (US)

(73) Assignee: X-Stream Technologies LLC, Stratford, TX (US)

( * ) Notice: Subject to any disclaimer, the term of this patent is extended or adjusted under 35 U.S.C. 154(b) by 0 days.

(21) Appl. No.: 16/748,511

(22) Filed: Jan. 21, 2020

(65) Prior Publication Data
US 2020/0236443 A1 Jul. 23, 2020

Related U.S. Application Data

(60) Provisional application No. 62/704,047, filed on Jan. 18, 2019.

(51) Int. Cl.
| H04N 21/6405 | (2011.01) |
| H04N 21/414 | (2011.01) |
| H04N 21/44 | (2011.01) |
| H04N 21/439 | (2011.01) |
| H04N 21/61 | (2011.01) |
| H02J 7/02 | (2016.01) |
| G06F 3/16 | (2006.01) |
| H04R 1/08 | (2006.01) |
| H04R 1/10 | (2006.01) |
| H02J 7/00 | (2006.01) |
| H04N 21/4363 | (2011.01) |

(52) U.S. Cl.
CPC ......... H04N 21/6405 (2013.01); G06F 3/165 (2013.01); H02J 7/0042 (2013.01); H02J 7/02 (2013.01); H04N 21/41407 (2013.01); H04N 21/4396 (2013.01); H04N 21/43635 (2013.01); H04N 21/44 (2013.01); H04N 21/6143 (2013.01); H04R 1/08 (2013.01); H04R 1/1041 (2013.01)

(58) Field of Classification Search
CPC ......... H04N 21/6405; H04N 21/41407; H04N 21/43635; H04N 21/4396; H04N 21/44; H04N 21/6143; G06F 3/165; H02J 7/0042; H02J 7/02; H04R 1/08; H04R 2420/09; H04R 1/1041; H04R 2420/07
See application file for complete search history.

(56) References Cited

U.S. PATENT DOCUMENTS

| 2009/0031007 | A1* | 1/2009 | Boic | G06F 16/4387 |
| | | | | 709/219 |
| 2014/0312827 | A1* | 10/2014 | Medica | H02J 7/342 |
| | | | | 320/103 |
| 2017/0205852 | A1* | 7/2017 | Owens, Jr. | H01R 31/06 |

* cited by examiner

Primary Examiner — Yogeshkumar Patel
(74) Attorney, Agent, or Firm — Rowan TELS LLC

(57) ABSTRACT

A portable multicast system includes a base unit and at least one satellite unit configured to be removably positioned within a recessed dock that electronically communicates with the base unit. The base unit includes a tablet dock configured for receiving and connecting to a tablet device, a display configured for displaying content from an imaging source, a microphone input with an associated gain control, a muting function, a level meter, a headphone output with an associated volume control, a USB port, and a master mute control. Each of the satellite units comprises a microphone input with an associated gain control, a mute button, a level meter, a USB port, and a headphone output with an associated volume control.

20 Claims, 9 Drawing Sheets

PORTABLE BROADCASTING SYSTEM

CROSS-REFERENCE TO RELATED APPLICATIONS

This application claims the benefit of U.S. provisional patent application Ser. No. 62/704,047, filed on Jan. 18, 2019, the contents of which are incorporated herein by reference in their entirety.

BACKGROUND

Broadcasting/streaming live content from a remote location can be a difficult task for some broadcasters with limited access to personnel. These broadcasters may often be required to carry large quantities of expensive audio and visual broadcasting equipment that may be difficult for a single person to carry and set up at the remote location. Transporting large quantities of equipment is not only a burden but carries the inherent risk of damaging the expensive equipment during transport. Therefore, a need exists for improving the broadcaster's ability to set up equipment for broadcasting/streaming from a remote location.

BRIEF SUMMARY

This disclosure relates to a portable multicast base unit apparatus. The portable multicast base unit apparatus may comprise a tablet dock, a display, a microphone input, a muting function, a headphone output, a master mute control, at least one power supply system, and a protective case. The tablet dock may be configured for receiving and connecting to a tablet device. The display may be configured for displaying content captured by an imaging source or content from the tablet device. The microphone input may be associated with a base unit microphone gain control. The headphone output may be associated with a base unit headphone volume control. The power supply system may be configured to charge at least one satellite unit. The protective case may be configured to enclose and protect the portable multicast base unit apparatus in its entirety. The protective case may be configured to include additional storage for additional associated equipment such as microphones, headphones, and audio and power cords.

This disclosure further relates to a portable multicast system. The portable multicast system may include the portable multicast base unit apparatus disclosed herein. The portable multicast base unit apparatus may further comprise at least one recessed dock configured to receive and connect to at least one satellite unit. The portable multicast system may further comprise at least one satellite unit. Each satellite unit may include a satellite microphone input with a satellite microphone gain control and a satellite headphone output with a satellite headphone volume control. The satellite unit may be configured to communicate with the base unit and configured to be removably positioned within the recessed dock.

Finally, this disclosure relates to a method for using a portable multicast system. The method first comprises providing the portable multicast system configured as disclosed herein, and further comprising a tablet device in the base unit tablet dock. The method then comprises receiving an audio signal through at least one of the microphone input of the base unit and the satellite microphone input. Next, the method comprises monitoring the audio signal through at least one of the headphone output of the base unit and the satellite headphone output using at least one headphone set. The method finally comprises broadcasting the audio signal through the base unit to a different location.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
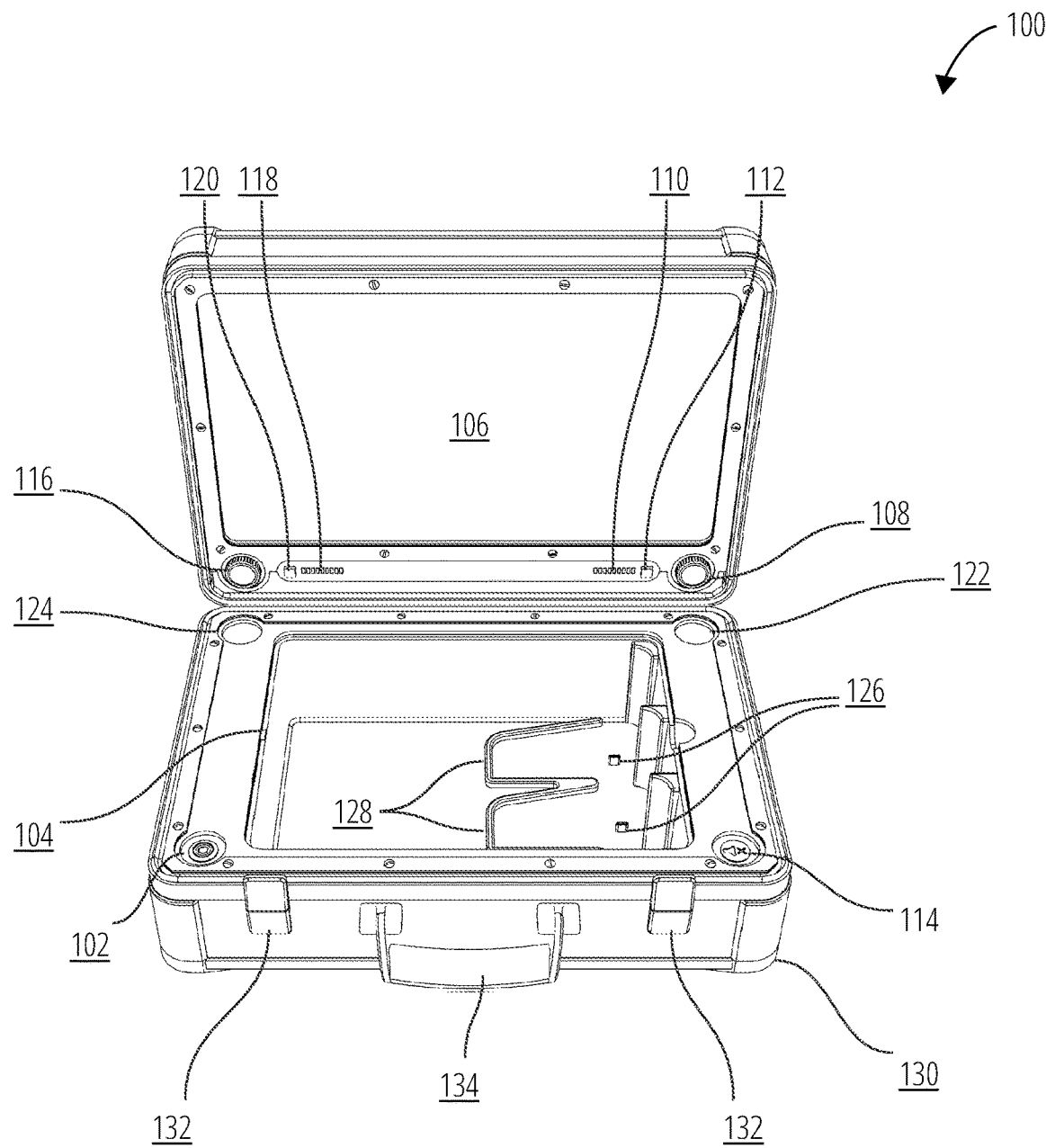
FIG. 1 illustrates a portable multicast base unit apparatus 100 in accordance with one embodiment.

The portable multicast system is a multi-purpose broadcasting device that has a set of features suited for a broadcaster on-the-go. The primary purpose of the portable multicast system is to replace the traditional bulky and messy equipment setup in a press box with a high-tech and compact broadcasting device. In an embodiment, the portable multicast system offers many of the features found in 50 lbs. worth of equipment as well as its own unique offerings.

The portable multicast system comprises a base unit and at least one satellite unit configured to be removably positioned within a recessed dock and connected to the base unit through a cable or a radio frequency (RF) link. A wired or cable connection may be made between a universal serial bus (USB) transmitter and receiver within each satellite unit and a USB transmitter and receiver within the base unit. Bluetooth or WiFi may be used to create the RF link in some embodiments.

In addition to the hardware necessary to connect to the base unit, each of the satellite units may comprise a microphone input with an associated volume control, a mute button, a volume meter and/or level meter, a headphone output with an associated volume control, and at least one USB port capable of connecting a USB device such as an audio headset with microphone, FLASH memory storage, etc.

The base unit comprises a tablet dock configured for receiving and connecting to a tablet device, a display configured for displaying content for an imaging source, a microphone input with an associated gain control, a mute button, a volume meter and/or level meter, a headphone output with an associated volume control, and a master mute control. The base unit's master mute control may allow the base unit user to selectively mute any or all of the microphones connected to the base unit, either directly, as part of the base unit, or via a wired or wireless connection between the base unit and the satellite units. This may be useful when commercials are played.

The base unit may also include a USB transmitter and receiver and may offer the user an option to plug a USB device such as an audio headset with microphone or FLASH memory storage directly into the base unit. An SD card may be included in some embodiments for additional storage capabilities. The base unit may accept video and audio input via an HDMI port or an ethernet port (e.g., CAT-5 port) for high definition video support.

The portable multicast system relies on a satellite unit. The satellite unit may comprise a preamplifier, a headphone amplifier, a USB charging port, a microphone gain control, and a headphone volume control, allowing individual broadcasters to have full control of the volume on their microphone input and headphone output. For input, each satellite unit may utilize an XLR jack, a ¼" jack, or an XLR/¼" combo jack for microphone input, with gain control, a mute button, and a volume meter and/or level meter. If a condenser microphone is used, a button enabling +48V Phantom Power may be an option. For output, each satellite unit may have a ¼" jack for headphones, with a corresponding volume control. The satellite unit may include at least one USB port, which may be used for both charging and, in some embodiments, data transmission.

FIG. 1 illustrates a portable multicast base unit apparatus 100 in accordance with one embodiment. The portable multicast base unit apparatus 100 comprises a base unit power button 102, a tablet dock 104, a display 106, an XLR connector 202 for base unit crowd microphone input (illustrated in FIG. 2), a base unit crowd microphone gain control knob 108, a base unit microphone level meter 110, a base unit microphone mute button 112, a master mute control 114, a base unit headphone output 206 (illustrated in FIG. 2), a base unit headphone output volume control knob 116, a base unit headphone output meter 118, a base unit headphone mute button 120, a microphone gain control knob recess 122, a headphone volume control knob recess 124, one or more USB power connections 126 for at least one satellite unit, one or more recessed docks for satellite units 128, a base unit charging port 208 (illustrated in FIG. 2), a protective case 130, a secure closing mechanism 132, and a handle 134.

The base unit power button 102 may be used to power on the base unit for operation. In some embodiments, docked satellite units and/or tablet devices may be able to charge from a base unit battery when the base unit is powered off. In other embodiments, powering off the base unit may act to inhibit this charging.

The tablet dock 104 may comprise an Apple Lightning™ or USB connector capable of electrically connecting directly to a tablet device. Alternately, a cable may be used to connect the tablet device to the tablet dock 104 if increased mobility of the tablet device is needed. Charging power and data signaling may be accomplished through this electrical connection. In some embodiments, the tablet dock 104 may further comprise mechanical features for securing the tablet device within the tablet dock 104 and for facilitating removal of the tablet device from the tablet dock 104. In one some embodiments, the portable multicast base unit apparatus 100 may incorporate circuitry to allow wireless connection between the tablet device and portable multicast base unit apparatus 100. This wireless connection may be accomplished via Bluetooth, Wifi, or some other RF signaling protocol. Data exchange may in these embodiments occur wirelessly. In some embodiments, where the wireless protocol allows, the tablet device may be charged wirelessly through the wireless connection.

The display 106 may comprise a folding lid with a display within it as a feature of the portable multicast base unit apparatus 100 as shown. In some embodiments, a video feed may be displayed on the display 106. In one embodiment, the folding display may be a 15.6" display (1920×1080 resolution) that receives an HDMI input (i.e., video feed) captured from an external device (i.e., imaging source). This allows the broadcaster to duplicate a display from a remote area, such as a score-keeper's table, through methods such as Apple Airplay™ and Chromecast™. In some embodiments, the display may be configured to show content from a tablet device, such as the tablet device connected through the tablet dock 104 or an additional or alternate tablet device.

The tablet dock 104 may reside below the display 106 within the portable multicast base unit apparatus 100 as shown, and a tablet device connected to the tablet dock 104 may in some embodiments display a keyboard or provide other touch-screen input options for controlling the display 106 or for controlling the audio input/output to the portable multicast base unit apparatus 100. For example, headphone output volume control, microphone input gain control, a muting function, a master mute control, and volume meters/level meters related to all audio input/output sources may be provided by an application on a tablet device connected to the tablet dock 104.

Figure 2:
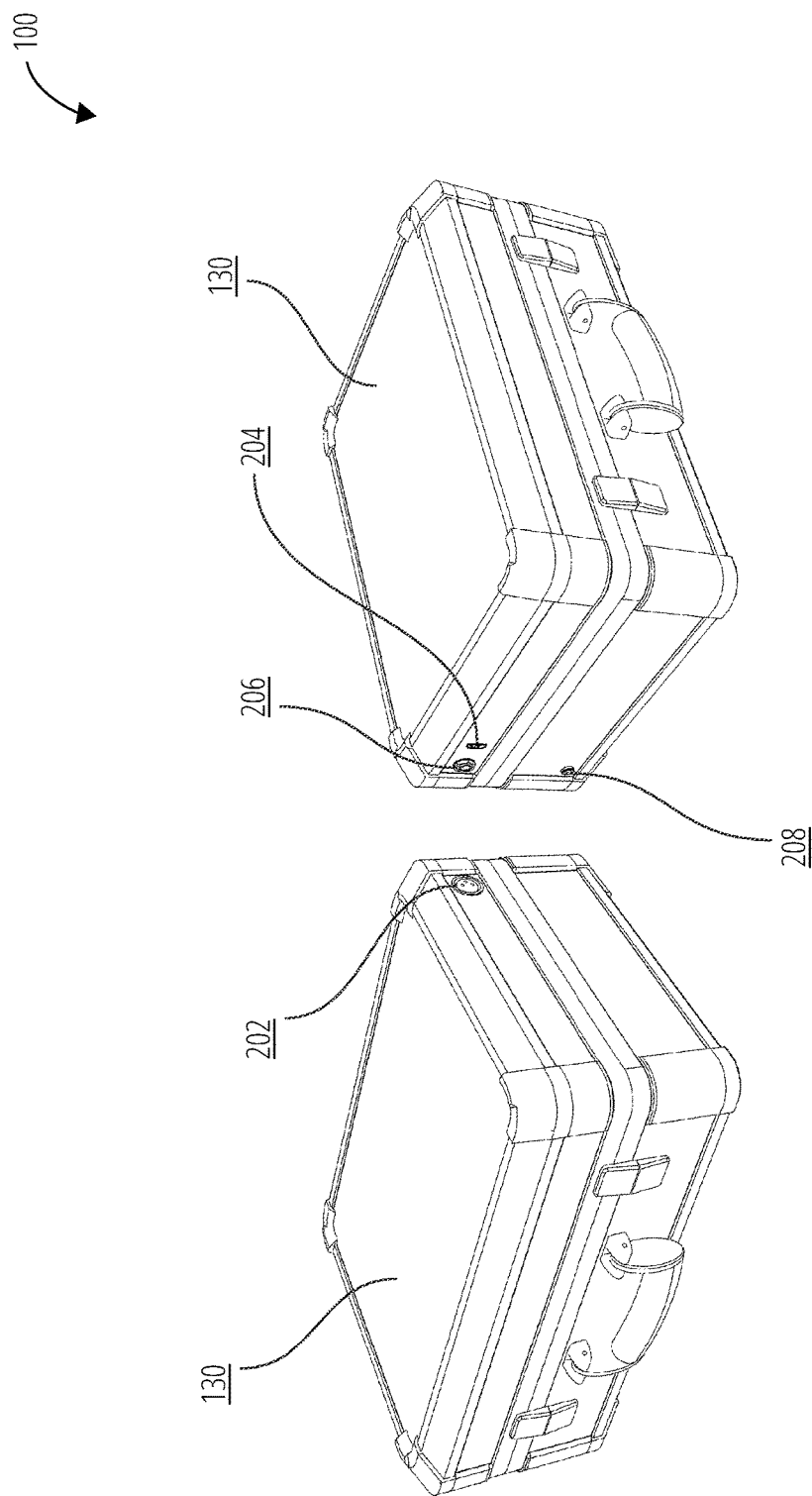
FIG. 2 illustrates a portable multicast base unit apparatus 100 in accordance with one embodiment.

The microphone input of the portable multicast base unit apparatus 100 may in some embodiments comprise a base unit crowd microphone plugged in via an XLR jack (such as XLR connector 202 illustrated in FIG. 2). The XLR connector 202 may be connected to a remotely mounted crowd microphone, such as the microphone 308 illustrated in FIG. 3, or the XLR connector 202 may be replaced with or accompany a completely built in base unit crowd microphone. The base unit crowd microphone, whether remote or built in, may provide a signal representation of ambient sound, such as crowd noise within a stadium or other arena. The gain of this microphone may be controlled by the base unit crowd microphone gain control knob 108. A base unit microphone level meter 110 may provide a visual indicator of the gain levels applied to this microphone. The base unit microphone mute button 112 may be used to mute the input signal from this microphone, removing it from a broadcast stream. A master mute control 114 may be provided and may similarly mute all microphone input signals when pressed.

The base unit headphone output volume control knob 116 may provide a means for adjusting the volume or amplitude of a signal sent to an associated headphone output. The headphone output may be through a base unit headphone output 206 port as illustrated in FIG. 2. A base unit headphone output meter 118 may provide a visual indication of the volume level of this headphone output. A base unit headphone mute button 120 may be used to mute the output signal to the headphone set plugged into the base unit headphone output 206.

In some embodiments, the base unit crowd microphone gain control knob 108 and base unit headphone output volume control knob 116 features may protrude from their portions of the base unit. In such embodiments, a microphone gain control knob recess 122 and headphone volume control knob recess 124 may be provided for the base unit crowd microphone gain control knob 108 and base unit headphone output volume control knob 116 to rest within, respectively, when the portable multicast base unit apparatus 100 is in a closed position, as shown in FIG. 2.

Figure 3:
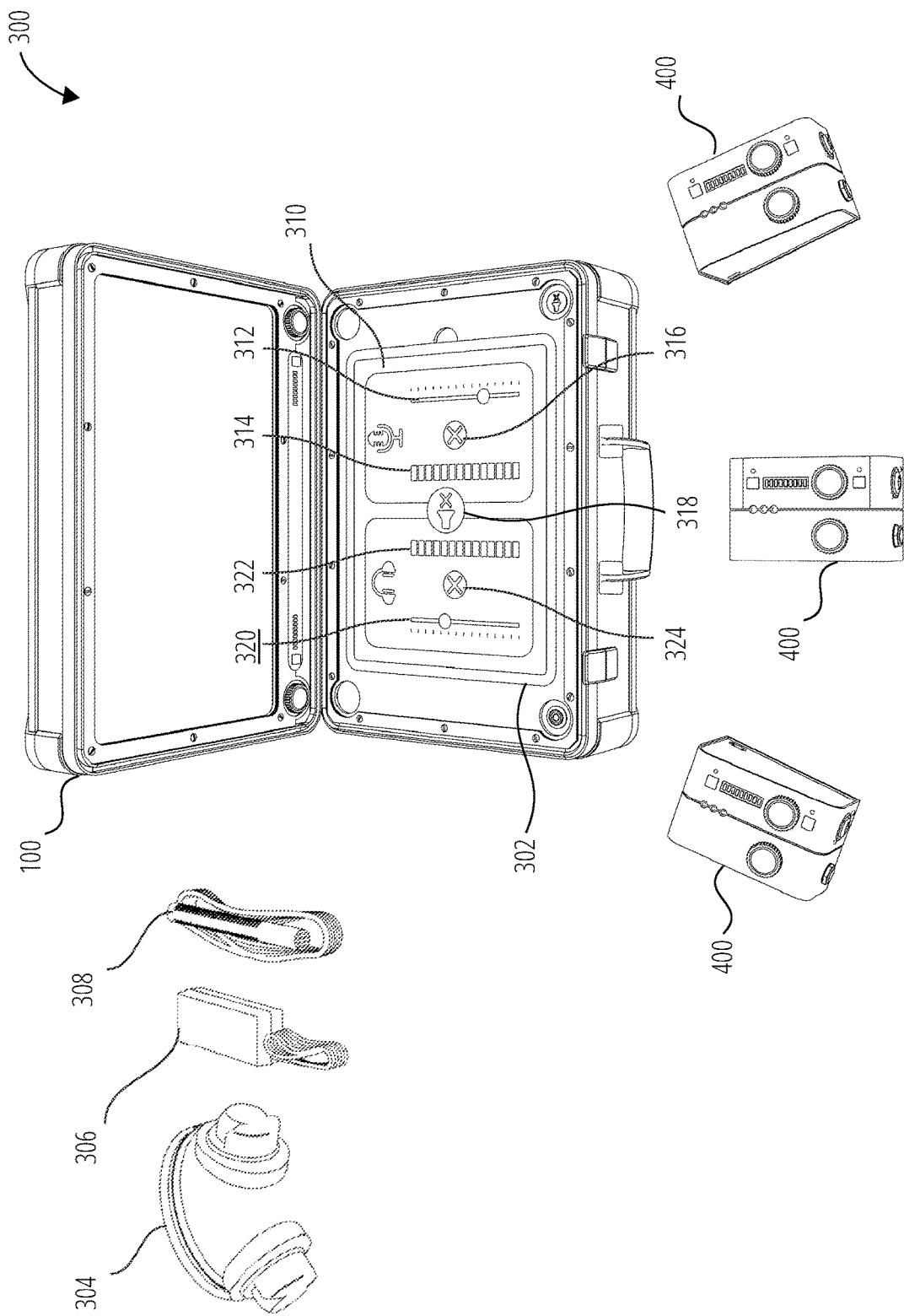
FIG. 3 illustrates a portable multicast system 300 in accordance with one embodiment.
Figure 4:
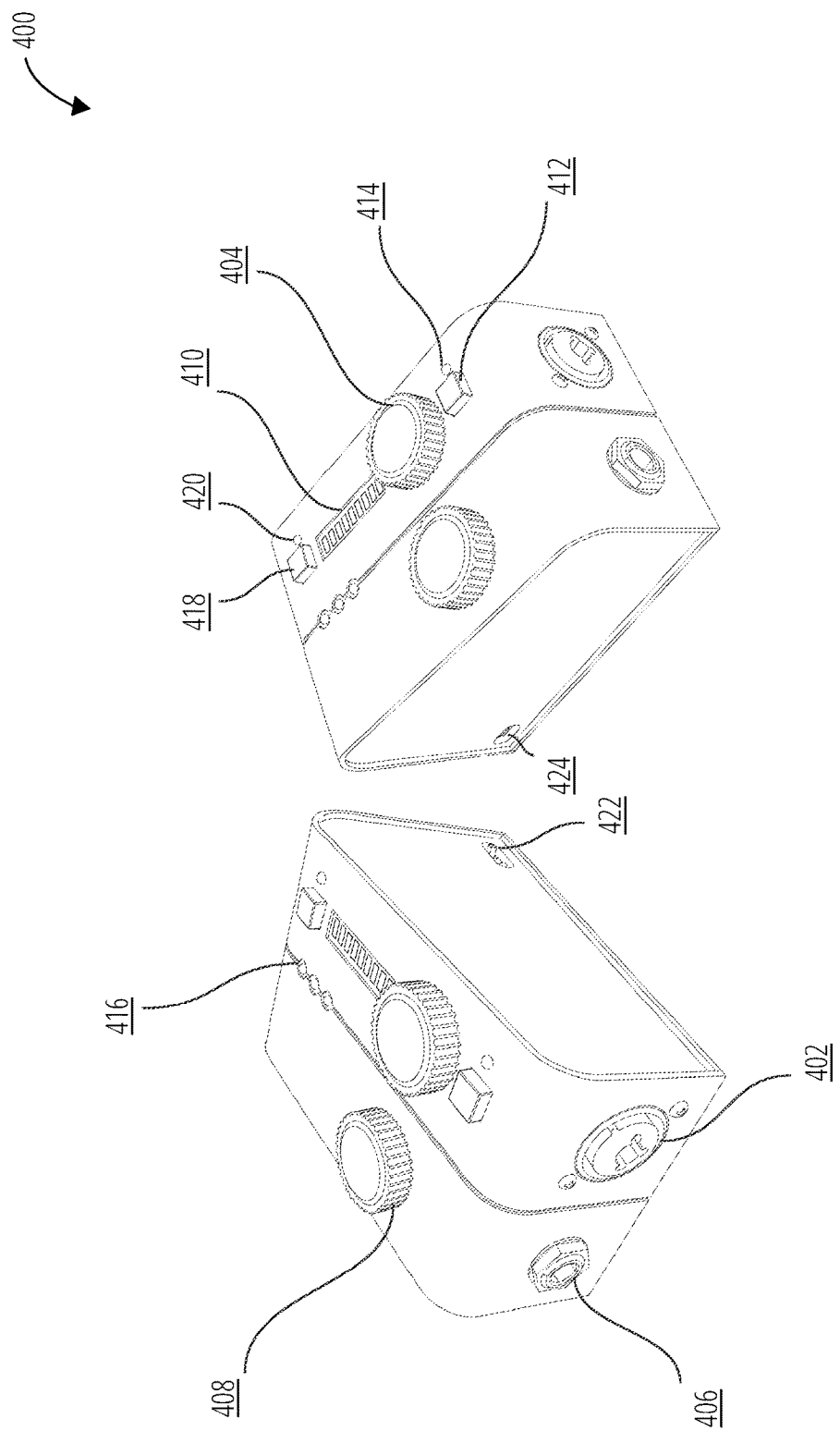
FIG. 4 illustrates a satellite unit 400 in accordance with one embodiment.

The portable multicast base unit apparatus 100 may incorporate one or more USB power connections 126, providing power to at least one satellite unit (illustrated in FIG. 3 and FIG. 4). In some embodiments, the power connections 126 may be located within recessed docks for satellite units 128. The recessed docks for satellite units 128 may be configured to hold the satellite units in place within the portable multicast base unit apparatus 100, such that they may be safely stored and charged within the protective case 130. The power connections 126 may provide connectivity to a power supply system configured within the portable multicast base unit apparatus 100. In some embodiments, the power connections 126 may be made using USB ports, which may also transmit data. In some embodiments, the power connections 126 may be configured to charge satellite units using a wireless charging system.

The portable multicast base unit apparatus 100 may be portable, with enough battery life to last throughout a broadcast. In an embodiment, the battery life may last at least eight hours and may provide the ability to charge a docked iPad and additional USB devices. Added portability may be provided by an integrated protective case 130 configured to be inseparable from and completely enclose the base unit in its entirety. The case may have secure closing mechanisms 132 and a handle 134, allowing the portable multicast base unit apparatus 100 to be closed up and carried safely and easily.

FIG. 2 further illustrates a portable multicast base unit apparatus 100 in accordance within one embodiment. The portable multicast base unit apparatus 100 is shown with the protective case 130 in a securely closed state. The portable multicast base unit apparatus 100 may further comprise an XLR connector 202, a base unit HDMI port 204, a base unit headphone output 206, and a base unit charging port 208 as illustrated.

The XLR connector 202 may act as a microphone input, allowing the portable multicast base unit apparatus 100 to incorporate a directional crowd microphone, such as the microphone 308 illustrated in FIG. 3. The portable multicast system allows for broadcasting flexibility with its ability to connect to a variety of external audio devices. The XLR connector 202 may in some embodiments act as an XLR output connector, allowing the portable multicast base unit apparatus 100 to connect to an external FM transmitter, such that the audio signal input to the portable multicast base unit apparatus 100 may be broadcast as a single produced feed output.

The base unit HDMI port 204 may allow a connection to an imaging source. The video feed from the imaging source may then appear on the display 106 shown in FIG. 1. In some embodiments, the display may receive images from a camera type device. A video camera may be connected to the base unit HDMI port 204 to provide a video feed, or the video feed may be transmitted from the tablet device or via internet streaming.

The base unit headphone output 206 may be a ¼" jack or may in some embodiments be a 3.5 mm jack. With the 3.5 mm jack, the portable multicast base unit apparatus 100 may connect to a laptop, phone, tablet device or similar devices and use them as an additional audio source and as another broadcaster device. The base unit headphone output 206 may alternately connect to a headphone set, allowing a user to listen to the audio feeds being input to the portable multicast base unit apparatus 100 from the base unit HDMI port 204, the XLR connector 202 acting as microphone input, an application on a tablet device connected to the tablet dock 104, and/or the satellite units.

The base unit charging port 208 may be used to connect the portable multicast base unit apparatus 100 to an external power source via a wall power adapter 306 (illustrated in FIG. 3). A typical external power source may be 120V AC power from a standard United States wall outlet, but as may be understood in the art, the disclosed apparatus may run on power from various sources through use of an appropriate adaptor.

FIG. 3 illustrates a portable multicast system 300 in accordance with one embodiment. The portable multicast system 300 comprises a portable multicast base unit apparatus 100 and at least one satellite unit 400. In some embodiments, the portable multicast system 300 may further comprise a tablet device 302, a headphone set 304, a wall power adapter 306, and a microphone 308.

Each of the satellite units 400 may be removably positioned within the one or more recessed docks for satellite units 128 and connected to the portable multicast base unit apparatus 100 over a wired or wireless connection. Connection between the portable multicast base unit apparatus 100 and the satellite units 400 may be made via USB, WiFi, BlueTooth, or some other wired or wireless protocol. In an embodiment, there may be three satellite units 400 that may be detached from the base unit. Each satellite unit 400 may have the controls necessary to allow individual broadcasters to have full control of their microphone input gain and headphone output volume. The satellite units 400 are described in further detail with regard to FIG. 4.

The headphone set 304 may be connected to the base unit headphone output 206 (shown in FIG. 2). In some embodiments, the headphone set 304 may be connected to the satellite unit headphone output 406 (see FIG. 4). Similarly, the microphone 308 may be connected to the XLR connector 202 of the portable multicast base unit apparatus 100 or the satellite unit microphone input 402. The wall power adapter 306 may be used to connect the power supply system of the portable multicast base unit apparatus 100 to an external power source, such as a wall power outlet, through the base unit charging port 208.

In an embodiment, one feature of the portable multicast system is its tablet device 302 integration using, for example, an Apple iPad™. The portable multicast system has a dedicated tablet dock that is adjustable for the various types and generations of iPads™. Other types of tablets, such as Android based tablets, may also be used. There are many ways to use the portable multicast system depending on the broadcaster's needs, particularly in the preferred application for broadcasting and/or recording. The broadcaster may have the option of using applications native to the iPad™ or connecting to an external device, such as a MacBook™ or Windows laptop, and utilizing more applications. In these cases, the tablet device 302 may act as an audio mixer for multiple audio channels (at least one satellite unit, one base unit, and in some embodiments, additional external line inputs).

In this manner, the base unit microphone input gain control 312, base unit microphone input level meter 314, base unit microphone mute button 316, base unit master mute control 318, base unit headphone volume control 320, base unit headphone output volume meter 322, base unit headphone output mute button 324, and other audio input/output controls may be incorporated into the portable multicast system 300 as features of an application 310 running on the tablet device 302. These controls may allow a user to control the relative and absolute amplitudes of various audio signals from the base unit, satellite units or other sources.

Controls may be implemented via physical (P) features or software (S) features provided through the tablet device application 310. The base unit crowd microphone gain control knob 108 (P) or base unit microphone input gain control 312 (S) may allow the user to adjust the gain applied to the audio input from the microphone 308 connected to the base unit. The base unit microphone level meter 110 (P) or base unit microphone input level meter 314 (S) may provide visual indication of the gain applied to input from the base unit crowd microphone and/or the microphone 308 connected to the base unit. The base unit microphone mute button 112 (P) and base unit microphone mute button 316 (S) may allow the user to mute input from the base unit crowd microphone, whether built in or using the microphone 308 connected to the base unit XLR connector 202. The master mute control 114 (P) or master mute control 318 (S) may allow the user to mute all microphone inputs connected to the portable multicast system 300. This may be useful when commercials are played.

The base unit headphone output volume control knob 116 (P) or the base unit headphone volume control 320 (S) may allow the user to adjust the volume of the signal transmitted through the headphone set 304 connected to the base unit via the base unit headphone output 206. The base unit headphone output meter 118 (P) or base unit headphone output volume meter 322 (S) may provide a visual indication of the volume level of output to the headphone set 304 connected to the base unit. The base unit headphone mute button 120 (P) or the base unit headphone output mute button 324 (S) may allow the user to mute the audio signal output to the headphone set via the base unit headphone output 206.

FIG. 4 illustrates satellite units 400 in accordance with one embodiment. Each satellite unit 400 may be configured with a satellite unit microphone input 402, a satellite microphone gain control 404, a satellite unit headphone output 406, and a satellite headphone volume control 408. In some embodiments, a satellite unit 400 may further comprise a satellite unit microphone input level meter 410, a satellite unit microphone muting function 412, a microphone mute indicator 414, charging indicator lights 416, a +48V Phantom Power button 418, a +48V Phantom Power indicator light 420, an on/off switch with power indicator light 422, and a satellite unit USB charging port 424 that may mate with the USB power connections 126 in the recessed docks for satellite units 128.

Each satellite unit 400 may have either an XLR jack, a ¼" jack, or an XLR/¼" combo jack for satellite unit microphone input 402, with a satellite microphone gain control 404 knob. This knob may be used to adjust the gain applied to the signal from the satellite unit microphone input 402. A satellite unit microphone input level meter 410 may provide a visible indication of this gain control. A satellite unit microphone muting function 412 button may allow the user to mute the signal from their satellite unit microphone input 402. When the satellite unit microphone input 402 is muted, a microphone mute indicator 414 may light up to indicate this muted status. If a condenser microphone is used, a +48V Phantom Power button 418 may supply DC electric power to the microphone. When the +48V Phantom Power Supply system is enabled, a +48V Phantom Power indicator light 420 may light up to indicate this enabled status.

For output, each satellite unit 400 may have a satellite unit headphone output 406. This may be a ¼" jack for plugging in a set of headphones, with an associated satellite headphone volume control 408. In some embodiments, an additional volume meter may provide the user with a visual indication of the volume level set by the satellite headphone volume control 408.

Charging indicator lights 416 may be incorporated into each satellite unit 400. These lights may provide visual indication of whether or not a satellite unit 400 is powered on, is charging, is in a low power state, or similar information. The satellite unit 400 may in some embodiments include an on/off switch with power indicator light 422.

In some embodiments, the satellite unit 400 may comprise a satellite unit USB charging port 424. This satellite unit USB charging port 424 may be used to connect the satellite unit 400 to the base unit power connections, either through a USB cable, or by direct mating connection to USB power connections 126 configured within the recessed docks of the base unit when the satellite unit 400 is docked. In some embodiments, a wireless connection to the base unit power supply system, rather than a wired connection, may be used to charge the satellite units 400. Additionally, in some embodiments, the satellite unit USB charging port 424 may be used to send audio or data signals between the satellite unit 400 and the base unit or other external device.

Figure 5:
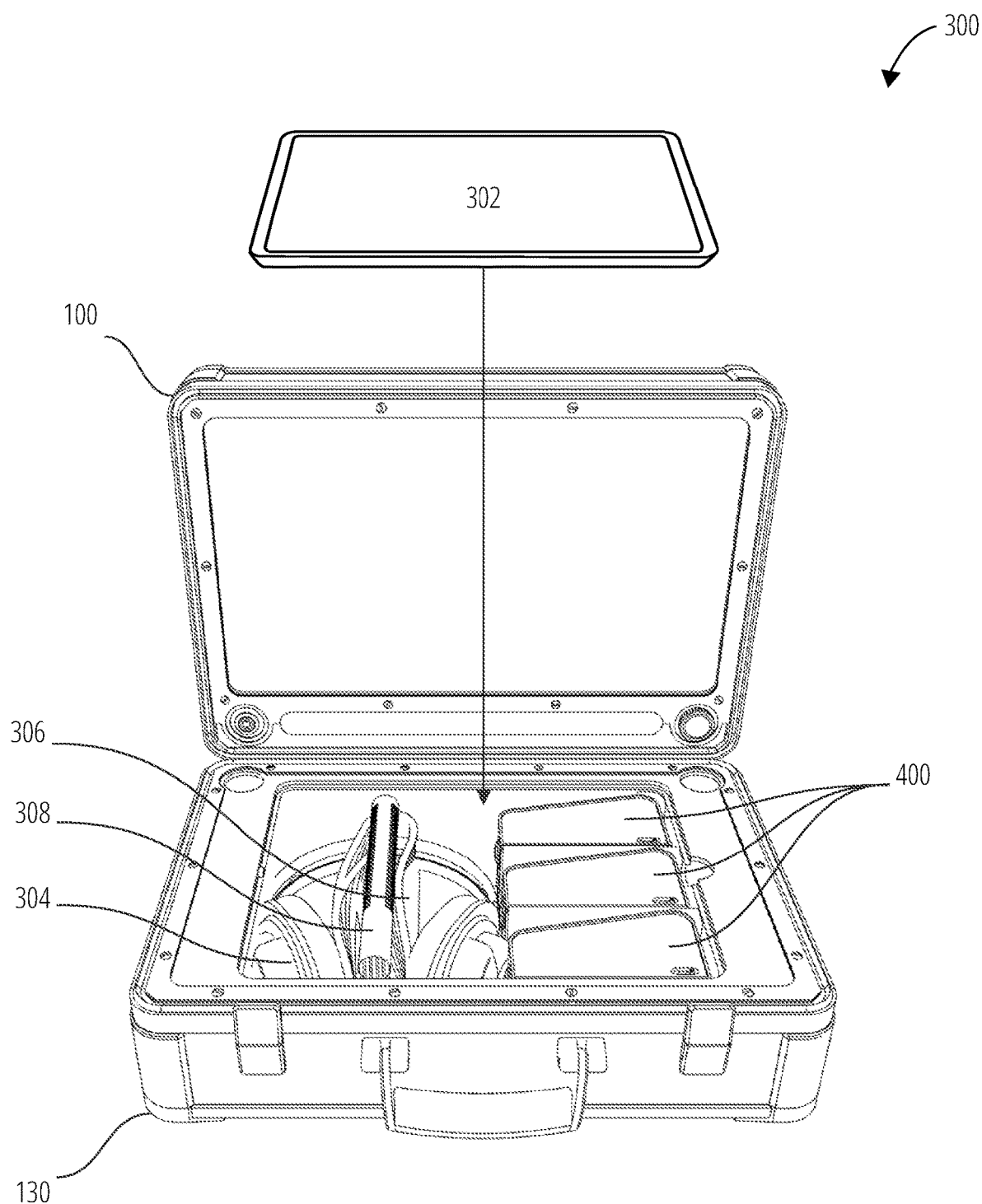
FIG. 5 illustrates a portable multicast system 300 in accordance with one embodiment.

FIG. 5 illustrates a portable multicast system 300 in accordance with one embodiment. The portable multicast base unit apparatus 100 may comprise a protective case 130. This protective case 130 may include recessed docks for the satellite units 400, as well as a compartment large enough to accommodate a headphone set 304, a microphone 308, and a wall power adapter 306. This compartment may be deep enough to accommodate these components beneath the tablet dock, leaving enough room for a tablet device 302 to also be installed within the portable multicast base unit apparatus 100 during transit.

Figure 6:
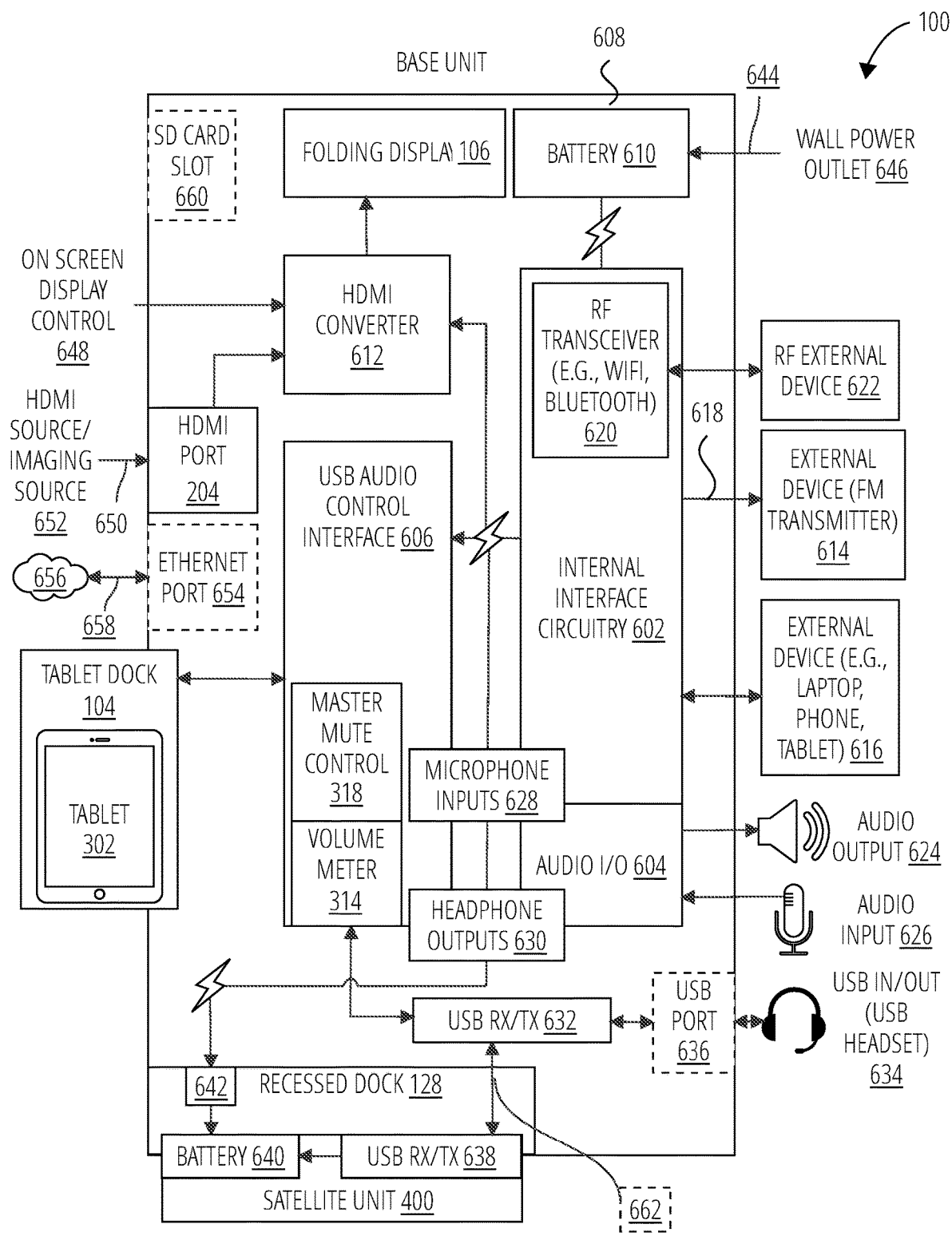
FIG. 6 illustrates a portable multicast base unit apparatus 100 in accordance with one embodiment.

FIG. 6 illustrates a block diagram of a portable multicast base unit apparatus 100 in accordance with one embodiment. The portable multicast base unit apparatus 100 shows the external connections between the printed circuit board assemblies and other components. There are two primary printed circuit board assemblies shown, but the design is not limited thereto. The assemblies may include an internal interface circuitry 602 and the base unit audio I/O circuitry 604, both of which are supported by breakout boards. Additional circuit modules may comprise a USB audio control interface 606, a power supply system 608 which may include a base unit battery 610, and an HDMI converter 612.

The internal interface circuitry 602 may be coupled to audio and USB I/O circuitry 702 of the satellite units 400, microphone inputs and headphone outputs to and from the USB audio control interface 606, power from a base unit battery 610, XLR output to external device (FM transmitter) 614, 3.5 mm Input/Output to external device (e.g., laptop, phone, tablet) 616, a headphone set, and a microphone. The output to the external device (FM transmitter) 614 may carry an audio signal 618 for radio broadcast.

The internal interface circuitry 602 breakout board may comprise a rotary potentiometer for gain control of microphone input, a rotary potentiometer for volume control of headphone output, a switch to toggle the muting function, and a switch to toggle +48V Phantom Power. The internal interface circuitry 602 may further comprise an RF transceiver (e.g., WiFi, Bluetooth) 620. By means of this RF transceiver (e.g., WiFi, Bluetooth) 620, the portable multicast base unit apparatus 100 may communicate with an RF external device 622. Such a device may be a tablet device, a laptop, a mobile phone, or any of a number of devices configured for RF signaling.

The internal interface circuitry 602 may comprise 8-pin connections to the base unit audio I/O circuitry 604, connections to the master mute, which may mute all microphone inputs from all satellite units and the base unit, external connections to the line loopback, connections from the headphones output of the USB audio interface and controller to the iPad and to other external devices. The 8-pin connections to the base unit audio I/O circuitry 604 may comprise microphone input differential (+ and −) and ground, headphone output differential (+ and −) and ground, and +12 VDC and ground. The internal interface circuitry may comprise a microphone input, preamplifier, +48V Phantom Power, a headphone driver, and a volume meter.

The internal interface circuitry 602 may comprise preamplifier circuitry for a line loopback, where the line loopback is a feature that takes line-level audio from the controlling tablet or an external source and feeds it back into the portable multicast system mixer. This allows the user to use the control tablet or an external device to create additional audio tracks or add sound effects that otherwise might not be possible. Since the interface uses a standard 4-pin ⅛" stereo jack, audio from mix 1 or mix 2 may be configured to be sent to the tablet or external device, allowing for flexible audio control and broadcasting from either device. The internal interface circuitry may comprise a master mute functionality that mutes all input from satellite unit microphones and a crowd microphone on the base unit. The internal interface circuitry may comprise a 12V regulator to buck (step-down) voltage from the battery to 12V, which is the primary voltage used in the circuitry.

The base unit audio I/O circuitry 604 may be operatively coupled to audio output 624 to a headphone set (such as the base unit headphone output 206 shown in FIG. 2), audio input 626 from a microphone (such as the XLR connector 202 shown in FIG. 2), and a breakout board. The breakout board may comprise a rotary potentiometer for volume control of microphone input, a rotary potentiometer for volume control of headphone output, a switch to toggle a muting function, and a switch to toggle +48V Phantom Power. The base unit audio I/O circuitry 604 may connect with additional microphone inputs 628 and headphone outputs 630 provided through the USB audio control interface 606.

In an embodiment, the base unit audio I/O circuitry 604 may comprise an 8-pin connection to the internal interface board, a breakout board, and voltage regulators for various circuitry functions, particularly the Phantom regulator for +48V Phantom Power. The 8-pin connections to the internal interface board comprise a microphone input differential (+ and −) and ground, headphone output differential (+ and −) and ground, +12 VDC and ground. The breakout board may comprise a rotary potentiometer for gain control of microphone input, a rotary potentiometer for volume control of headphone output, switch to toggle mute, and switch to Toggle +48V Phantom Power. The base unit audio I/O circuitry 604 may comprise a microphone input, preamplifier, a +48V Phantom Power, a headphone driver, and a volume meter.

The USB audio control interface 606 may receive power from the base unit battery 610. The USB audio control interface 606 may provide control of signals from a base unit USB RX/TX 632. The base unit USB RX/TX 632 may transmit and receive USB signaling to and from satellite units 400, a USB In/Out (USB headset) 634, and other USB-capable devices connected through a base unit USB ports 636. The USB audio control interface 606 may further connect to the tablet dock 104, allowing communication with a tablet device 302 capable of USB signaling. Power from the base unit battery 610 may be channeled through the USB audio control interface 606 and may be used to charge the tablet device 302, satellite unit 400, and any other connected devices capable of charging via USB.

The USB audio control interface 606 may incorporate audio controls such as a base unit microphone input level meter 314 and a master mute control 318, described in further detail with regard to FIG. 3. In this manner, such controls may be applied simultaneously to all USB audio signals transmitted and controlled via portable multicast base unit apparatus 100.

The base unit battery 610 may be connected to wall power input 644 from a wall power outlet 646 by means of the wall power adapter 306 illustrated in FIG. 3. In some embodiments, the wall power adapter may be an alternating current to direct current (AC/DC) adaptor configured to transform 120V AC power from a standard United States power socket to a DC voltage, which may be used to power the circuitry within the portable multicast base unit apparatus 100, as well as charge the tablet device 302, satellite units 400, and similar peripheral devices.

The HDMI converter 612 may receive input from on screen display control 648 (which in some embodiments may be provided from the tablet device 302) and a video feed 650 from an HDMI source/imaging source 652 received through the base unit HDMI port 204. Input from these sources may be processed by the HDMI converter 612 and output in the form of a signal to the display 106 of the portable multicast base unit apparatus 100. In some embodiments, these signals may be sent to the tablet device 302 in addition to the display 106. In some embodiments the base unit HDMI port 204 may also receive audio signal input via HDMI signaling. These signals may in some embodiments be sent to the USB audio control interface 606 to be controlled along with other audio channels.

The recessed docks for satellite units 128 of the portable multicast base unit apparatus 100 may communicate with the USB audio control interface 606 by means of USB signaling between the satellite unit USB RX/TX 638 and base unit USB RX/TX 632, connected either through direct connection of a docked satellite unit 400 to a base unit USB port, cabled USB connection between the portable multicast base unit apparatus 100 and satellite unit 400, or wireless connection/wireless charging system 662. Power from the base unit battery 610 may be used to charge the satellite unit battery 640 via this USB or wireless connection. In some embodiments, a separate charge port 642 may be provided, or the charge port 642 may be the same as the USB port within the recessed docks for satellite units 128. In some embodiments, the satellite unit battery 640 may be charged via a USB cable connected to a USB charge capable wall adaptor, a laptop, or other device capable of providing adequate charge power over USB protocol. In some embodiments, a satellite unit battery 640 may be wirelessly charged using a device other than the base unit, such as a mobile phone or wireless charging stand.

Some embodiments of a portable multicast base unit apparatus 100 may further comprise an ethernet port 654. Connection to the internet 656 may be made via this port, in order to receive or transmit broadcast media from processed or unprocessed video feed and audio input/output, to a fully produced audio-visual broadcast signal 658 for streaming or recording and presentation online. The audio-visual broadcast signal 658 may include a new video feed created by augmenting and/or editing a video feed 650 from an HDMI source/imaging source 652 by means of an application installed on the tablet device 302 in the tablet dock 104.

In some embodiments, an SD card slot 660 may be included in the portable multicast base unit apparatus 100. By this means, files stored on an SD card may be accessible for display on the display 106 and manipulation and display on the tablet device 302. In some embodiments, a synthesized audio-visual feed created using the portable multicast base unit apparatus 100 may be stored on an SD card.

Figure 7:
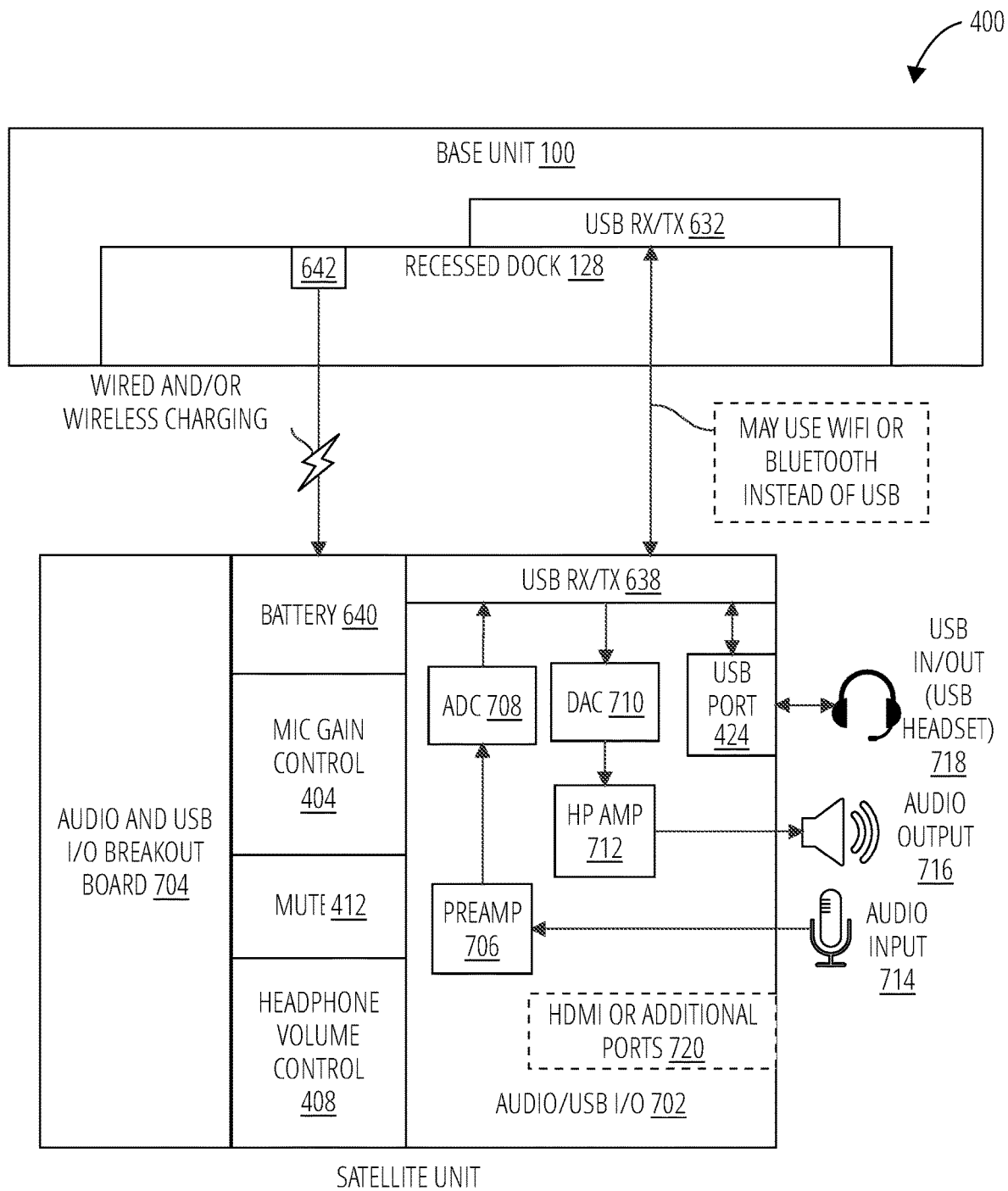
FIG. 7 illustrates a satellite unit 400 in accordance with one embodiment.

FIG. 7 illustrates a block diagram of a satellite unit 400. The satellite unit 400 shows the external connections between the printed circuit board assemblies and other components. In this embodiment, there is one primary printed circuit board assembly but not limited thereto, the audio and USB I/O circuitry 702 located on each satellite unit, which is supported by an Audio and USB I/O breakout board 704.

The audio and USB I/O circuitry 702 may be operatively coupled to a microphone (audio input 714), a headphone set (audio output 716), a USB device (USB in/out (USB headset) 718) and an Audio and USB I/O breakout board 704. The Audio and USB I/O breakout board 704 may comprise a rotary potentiometer for gain control of audio input 714, a rotary potentiometer for volume control of audio output 716, a switch to toggle a satellite unit microphone muting function 412, and a switch to toggle +48V Phantom Power.

The audio and USB I/O circuitry 702 may comprise a preamp 706 to process audio input 714 before sending it to an ADC 708 for conversion to a digitized audio signal suitable for transmission by the satellite unit USB RX/TX 638. The satellite microphone gain control 404 may be used to control amplification of the audio input 714 through the preamp 706 in some embodiments. The satellite unit microphone muting function 412 may also act upon the audio input 714 so as to reduce gain on audio input 714 to zero, interrupt the electronic signa from the audio input 714, or otherwise mute audio input 714 connected to the satellite unit 400.

The audio and USB I/O circuitry 702 may further comprise a headphone amplifier (HP amp) such as HP amp 712 to adjust the amplitude of the audio output 716 signal, and thus the audio volume. The satellite headphone volume control 408 may be used to control this amplification at the HP amp 712. The HP amp 712 may receive audio from the satellite unit USB RX/TX 638 through a DAC 710.

The audio and USB I/O circuitry 702 may include a satellite unit USB charging port 424. By this means a USB in/out (USB headset) 718 may be connected to the satellite unit 400. By means of the satellite unit USB RX/TX 638, audio input/output may be transmitted to and from the portable multicast base unit apparatus 100 from the USB in/out (USB headset) 718. The satellite microphone gain control 404, satellite headphone volume control 408, and satellite unit microphone muting function 412 may be configured to control the audio input/output transmitted to and from the USB in/out (USB headset) 718.

The audio and USB I/O circuitry 702 may provide connection to HDMI or additional ports 720 in some embodiments. These connections may provide additional signal channels, control features, or charging capabilities. In some embodiments, a satellite unit 400 may be connected to a mobile device rather than the portable multicast base unit apparatus 100. By this means, a single satellite unit 400 and mobile device may be used as a standalone portable multicast system 300 or may be able to better connect to a portable multicast base unit apparatus 100 at a great distance.

The recessed docks for satellite units 128 of the portable multicast base unit apparatus 100 may communicate with the USB audio control interface 606 by means of USB signaling between the satellite unit USB RX/TX 638 and base unit USB RX/TX 632, connected either through direct connection of a docked satellite unit 400 to a base unit USB port, cabled USB connection between the portable multicast base unit apparatus 100 and satellite unit 400, or wireless connection/wireless charging system 662. Power from the base unit battery 610 may be used to charge the satellite unit battery 640 via this USB or wireless connection. In some embodiments, a separate charge port 642 may be provided, or the charge port 642 may be the same as the USB port within the recessed docks for satellite units 128.

Figure 8:
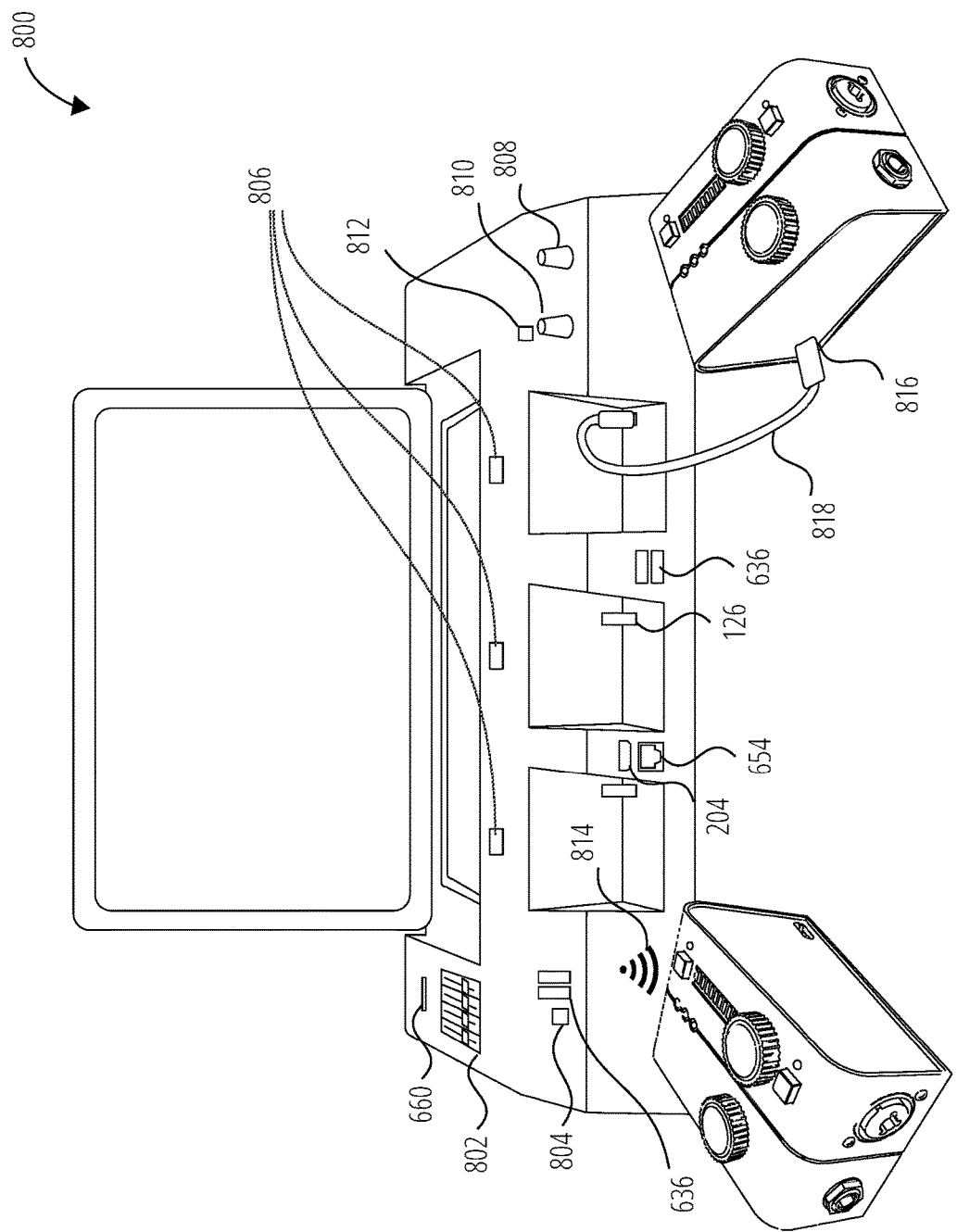
FIG. 8 illustrates a portable multicast system without protective case 800 in accordance with one embodiment.

FIG. 8 illustrates a portable multicast system without protective case 800 in accordance with one embodiment. The components of the portable multicast system may be connected and used in a form factor that does not include a protective case integrated inseparably with the base unit. A protective case may be configured to house the components of the portable multicast system, while allowing all components to be removed from the protective case.

Additional features of the portable multicast system and portable multicast base unit apparatus are illustrated. These include an SD card slot 660, a master volume meter/level meter 802, a base unit mute button 804, base unit USB ports 636, satellite unit mute buttons 806, an ethernet port 654, a base unit HDMI port 204, power connections 126, a microphone gain control knob 808, a headphone output volume control knob 810, and a master mute control button 812.

The base unit HDMI port 204 may provide access to a video feed as described with regard to FIG. 2 and FIG. 6. The base unit USB ports 636 may provide connection to a number of external USB devices. The ethernet port 654 (e.g., CAT-5 port) may provide a connection to the internet. The SD card slot 660 may accept an SD card, providing additional files and storage capability. These features may function as described with regard to FIG. 6.

The master volume meter/level meter 802, base unit mute button 804, satellite unit mute buttons 806, microphone gain control knob 808, headphone output volume control knob 810, and master mute control button 812 may provide physical mechanisms to implement the control features previously discussed. These options illustrate only one embodiment. The associated functions may be accomplished with any combination of knobs, dials, switches, sliders, buttons, or other actuators allowing a user to control gain and volume of all audio inputs/outputs to the base unit.

Also illustrated are a wireless connection to satellite unit 814 and a wired connection to satellite unit 816. The wired connection to satellite unit 816 may be to the USB power connections 126 of the base unit by means of a cable 818. In one embodiment, power connections 126 may be USB ports, and the cable 818 may be a USB cable to the satellite unit USB port, as illustrated.

Figure 9:
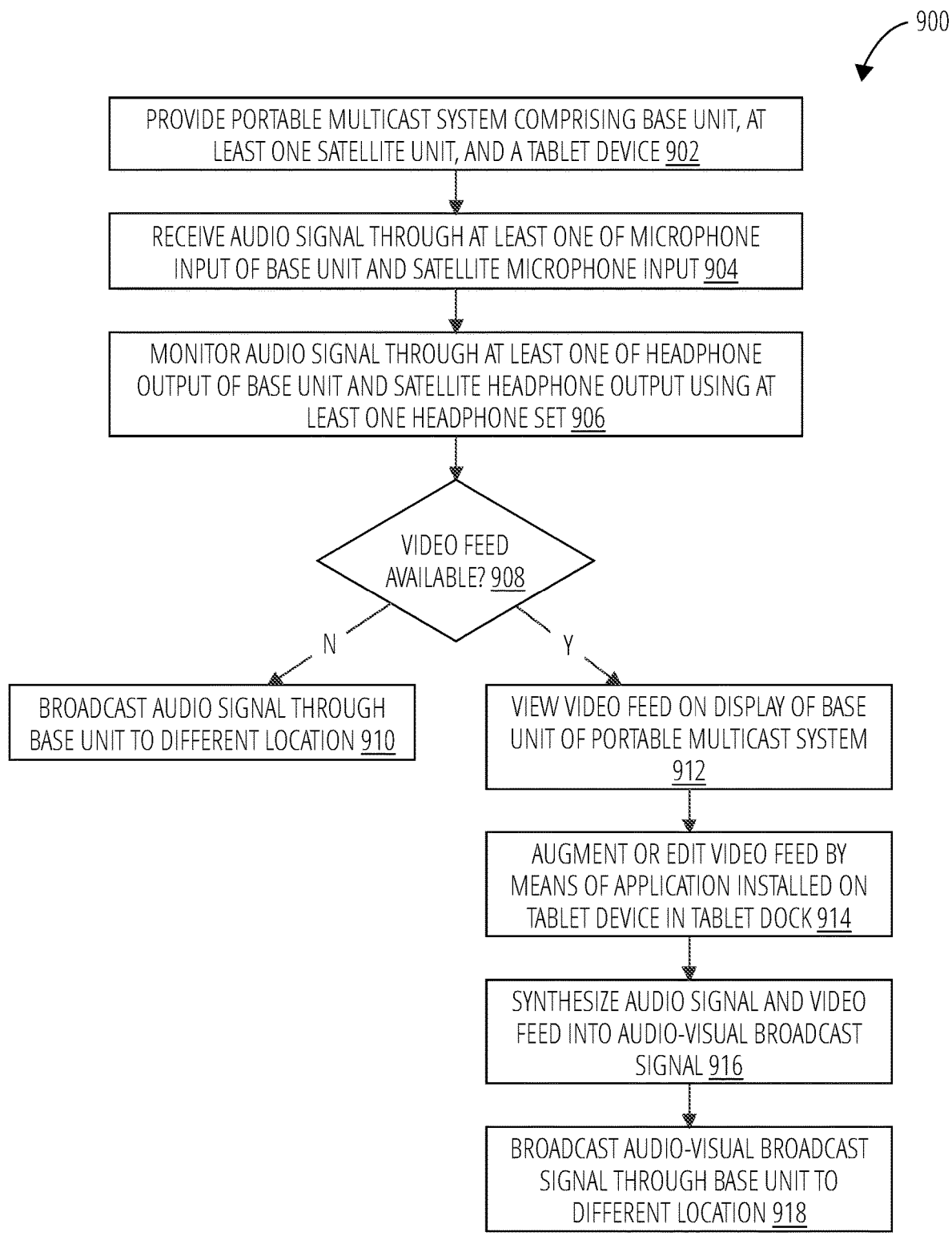
FIG. 9 illustrates a routine 900 in accordance with one embodiment.

FIG. 9 illustrates a routine 900 for operating a portable multicast system as disclosed herein. First, a portable multicast system may be provided in step 902, comprising a base unit and at least one satellite unit. These may be configured as described previously. The base unit may comprise a tablet dock, at least one recessed dock configured to accept the satellite unit, a display, a microphone input with gain control, a muting function, a headphone output with volume control, and a master mute control. The satellite unit may be configured to communicate with the base unit and may be removably positioned within the recessed dock of the base unit. The satellite unit may comprise a microphone input with gain control, a headphone output with volume control. They portable multicast system provided may further comprise a tablet device in the tablet dock.

An audio signal may be received in step 904 through at least one of the base unit microphone input and a satellite microphone input, provided in step 902. In some embodiments, audio signals may be received from multiple microphones, connected to the base unit microphone input, multiple satellite microphone inputs, USB ports configured on the base unit and/or satellite units, or other audio sources capable of wired or wireless connection to the base unit, depending on the ports and signaling protocols provided in the embodiment.

The audio signal received in step 904 may be monitored in step 906 through at least one of the headphone output of the base unit and the satellite headphone output using at least one headphone set. In some embodiments, the audio signal may be monitored through multiple headphone sets, connected to the base unit, multiple satellite units, USB ports configured on the base unit and/or satellite units, or other audio outputs capable of wired or wireless connection to the base unit, depending on the ports and signaling protocols provided in the embodiment.

In step 908, availability of a video feed in addition to an audio signal may be considered. In the absence of a video feed, step 910 may proceed with no additional action. The audio signal received in step 904 and monitored in step 906 may be broadcast through the base unit to a different location. In some embodiments, multiple audio signals from multiple sources may be mixed using the base unit. Mixing may be controlled based on gain control and mute settings. In some embodiments, an application on the tablet device may be used to perform more sophisticated signal mixing. The mixed audio signal generated from the multiple sources may then be broadcast as a single audio signal feed. In some embodiments, the audio signal may be structured for stereophonic broadcast or other multichannel broadcast formats.

If a video feed is available, as considered in step 908, the video feed may be viewed in step 912. In one embodiment, the video feed may be viewed on the display of the base unit of the portable multicast system. In some embodiments, the video feed may be additionally or alternatively viewed on the tablet device in the tablet dock. Other video display devices may be connected to the base unit through, for example, an HDMI port, an ethernet port, or other wired or wireless connections supporting video signaling.

The video feed viewed in step 912 may be augmented or edited in step 914 by means of an application installed on the tablet device in the tablet dock. Banners, inset graphics, text, or other visual features may be added to the received video feed. Video frames may be manipulated to create slow-motion segments, apply pixilation or blurring of features requiring censorship, include highlighting features such as arrows, circles, or the like, or other modifications of a live video feed to enhance it for broadcast. In some embodiments, the video feed may be sent via the HDMI port to an external device for modification.

The edited video feed from step 914 (or in some embodiments an unedited video feed) may be synthesized with the audio signal from earlier steps in step 916. This may be performed to create a single, synchronized audio-visual broadcast signal. This synthesis may be performed using an application installed on the tablet device in the tablet dock, or on an external device supported by the ports provided in a particular embodiment of the portable multicast system.

The synthesized audio-visual broadcast signal from step 916 may finally be broadcast in step 918. The base unit may broadcast the audio-visual broadcast signal online by means of an ethernet port. The audio-visual broadcast signal may be sent via an HDMI port to a nearby monitor. The audio-visual broadcast signal may be sent through additional routing hardware to be displayed on a stadium jumbotron and played on stadium loudspeakers, or for broadcast for television viewing. Other embodiments may support other broadcast options, based on the signals available as inputs and outputs to specific portable multicast system embodiments.

The apparatus, system, and method in this disclosure are described in the preceding on the basis of several preferred embodiments. Different aspects of different variants are considered to be described in combination with each other such that all combinations that upon reading by a skilled person in the field on the basis of this document may be regarded as being read within the concept of the invention. The preferred embodiments do not limit the extent of protection of this document.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

Having thus described embodiments of the present invention of the present application in detail and by reference to illustrative embodiments thereof, it will be apparent that modifications and variations are possible without departing from the scope of the present invention.

What is claimed is:

1. A portable multicast base unit apparatus comprising:
   a tablet dock configured for receiving and connecting to a tablet device;
   a display configured for displaying content captured by an imaging source or content from the tablet device;
   a microphone input, including at least one of an XLR jack or an XLR/¼ inch combination jack, with a base unit microphone gain control, wherein the XLR jack or the XLR/¼ inch combination jack is configured to provide phantom power;
   a muting function;
   a headphone output with a base unit headphone volume control;
   a master mute control;
   at least one power supply system configured to charge at least one satellite unit; and
   a protective case configured to enclose and protect the portable multicast base unit apparatus in its entirety.

2. The portable multicast base unit apparatus of claim 1, wherein the at least one power supply system is configured to charge the more than one satellite units using a USB port.

3. The portable multicast base unit apparatus of claim 1, wherein the at least one power supply system is configured to charge the more than one satellite units using a wireless charging system.

4. The portable multicast base unit apparatus of claim 1, further comprising more than one recessed dock, wherein the more than one recessed docks include a power connection configured to charge the more than one satellite units when the more than one satellite units are positioned within the more than one recessed dock.

5. The portable multicast base unit apparatus of claim 1, wherein at least one of a volume control of the headphone output, a gain control of the microphone input, the muting function, and the master mute control is provided by an application configured on the tablet device connected to the tablet dock.

6. The portable multicast base unit apparatus of claim 1, further comprising a base unit crowd microphone.

7. A portable multicast system comprising:
a base unit including:
a tablet dock configured for receiving and connecting to a tablet device;
at least one recessed dock configured to receive more than one satellite unit;
a display configured for displaying content captured by an imaging source or content from the tablet device;
a microphone input, including at least one of an XLR jack or an XLR/¼ inch combination jack, with a base unit microphone gain control, wherein the XLR jack or the XLR/¼ inch combination jack is configured to provide phantom power;
a muting function;
a headphone output with a base unit headphone volume control; and
a master mute control;
the more than one satellite units including:
a satellite external microphone input, including at least one of a satellite XLR jack or a satellite XLR/¼ inch combination jack, with a satellite external microphone gain control and a satellite external microphone input level meter, wherein the satellite XLR jack or the satellite XLR/¼ inch combination jack is configured to provide phantom power; and
a satellite headphone output with a satellite headphone volume control and a satellite volume meter, wherein the at least one satellite unit is configured to communicate with the base unit and configured to be removably positioned within the more than one recessed dock.

8. The portable multicast system of claim 7, the base unit further comprising at least one of a wall power input, a volume meter, a base unit crowd microphone, a USB port, and an HDMI port, wherein the HDMI port is configured to provide the imaging source as a video feed.

9. The portable multicast system of claim 7, wherein the more than one recessed dock includes a power connection configured to charge the more than one satellite unit when the more than one satellite unit is positioned within the more than one recessed dock.

10. The portable multicast system of claim 7, the more than one satellite units further comprising more than one of a muting function associated with the microphone input, a level meter for the microphone input, and a USB port.

11. The portable multicast system of claim 7, wherein the more than one satellite unit is charged via a wireless charging system.

12. The portable multicast system of claim 11, wherein the wireless charging system is integrated in the base unit.

13. The portable multicast system of claim 7, wherein at least one of the base unit headphone volume control, the satellite headphone volume control, the base unit microphone gain control, the satellite microphone gain control, the muting function, and the master mute control is provided by an application configured on the tablet device connected to the tablet dock.

14. The portable multicast system of claim 7, further comprising at least one of the tablet device, a headphone set, a microphone, and a wall power adapter.

15. The portable multicast system of claim 7, wherein the base unit is integrated into a protective case configured to enclose and protect the portable multicast system in its entirety.

16. A method comprising:
providing a portable multicast system, the portable multicast system comprising:
a base unit including:
a tablet dock configured for receiving and connecting to a tablet device;
more than one recessed dock configured to receive more than one satellite unit;
a display configured for displaying content captured by an imaging source or content from the tablet device;
a microphone input, including at least one of an XLR jack or an XLR/¼ inch combination jack, with a base unit microphone gain control, wherein the XLR jack or the satellite XLR/¼ inch combination jack is configured to provide phantom power;
a muting function;
a headphone output with a base unit headphone volume control; and
a master mute control;
the more than one satellite units including:
a satellite microphone input, including at least one of a satellite XLR jack or a satellite XLR/¼ inch combination jack, with a satellite microphone gain control and a satellite microphone input level meter, wherein the satellite XLR jack or the satellite XLR/¼ inch combination jack is configured to provide phantom power; and
a satellite headphone output with a satellite headphone volume control and a satellite volume meter, wherein the more than one satellite units are configured to communicate with the base unit and are configured to be removably positioned within the more than one recessed docks;
the tablet device in the tablet dock;
receiving an audio signal through at least one of the microphone input of the base unit and the satellite microphone input;
monitoring the audio signal through at least one of the headphone output of the base unit and the satellite headphone output using at least one headphone set; and
broadcasting the audio signal through the base unit to a different location.

17. The method of claim 16, further comprising viewing a video feed on the display of the base unit of the portable multicast system.

18. The method of claim 17, further comprising augmenting or editing the video feed by means of an application installed on the tablet device in the tablet dock.

19. The method of claim 17, further comprising synthesizing the audio signal and video feed into an audio-visual broadcast signal.

20. The method of claim 19, further comprising broadcasting the audio-visual broadcast signal through the base unit.

* * * * *